Figure 1:
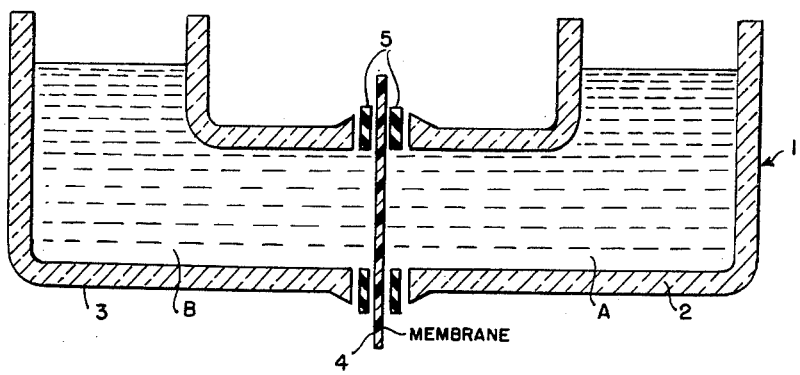

Dec. 18, 1962  M. MINDICK ET AL  3,069,340
DIALYSIS METHOD AND SEMI-PERMEABLE MEMBRANE THEREOF
Filed Oct. 27, 1958

INVENTORS:
MORRIS MINDICK
ROY ODA
BY Margsee, Johnston, Cook & Root
ATT'YS

United States Patent Office 3,069,340
Patented Dec. 18, 1962

3,069,340
DIALYSIS METHOD AND SEMI-PERMEABLE
MEMBRANE THEREOF
Morris Mindick and Roy Oda, Chicago, Ill., assignors to
Nalco Chemical Company, a corporation of Delaware
Filed Oct. 27, 1958, Ser. No. 769,724
16 Claims. (Cl. 204—180)

This invention relates to new and improved semi-permeable membranes and their production, and also to novel methods and apparatus employing the new membranes. The membranes are especially useful in dialysis methods and apparatus.

Dialysis has proven to be useful in a number of applications, such as in the recovery of caustic soda, of acids and of sugars. Thus, caustic soda is recovered from industrial wastes in the viscose industry. Acids and metals are separated from electrolytic liquors. Sugars may be separated from dextrins in corn starch conversion syrup. Dialysis may also be employed in the production of dairy products, such as in separation of solutes in skim milk. In these applications, parchment and cellophane are commonly used as semi-permeable membranes or dialyzers. Semi-permeable membranes find application as battery separators. Other applications of dialysis are made, and potential applications await the development of suitable techniques and, particularly, more satisfactory commercial membranes. In present and contemplated applications, there exists a need for membranes having substantial resistance to the chemical and physical conditions encountered and yet which provide low resistance to diffusion therethrough.

Dialysis membranes are commonly prepared by blending a substantial proportion of a leachable material such as sodium chloride into a water-insoluble resinous film-forming material. The soluble material is leached from the film to produce a macroporous membrane. However, the membranes produced in this manner are relatively weak. Cellophane has molecular-size pores but low acid resistance, which limits its usefulness. Likewise, the useful life of parchment is short.

The present invention has for its object to provide new and improved semi-permeable membranes which overcome the disadvantages previously encountered and increase the number and efficiencies of dialysis operations.

A particular object is to provide semi-permeable membranes which are characterized by improved resistance to the chemical and physical conditions encountered, and especially, have much improved resistance to acid and alkali attack.

A further object is to provide semi-permeable membranes which are characterized by low resistance to diffusion therethrough.

An additional object is to provide strong membranes which are resistant to the physical forces encountered in use and which are adaptable to use in various apparatuses such as dialyzers and electrolytic cells.

Another object is to provide a method for producing semi-permeable membranes having the described characteristics, and especially a convenient and reliable method.

A further object is to provide a method for producing the membranes which may be controlled to produce the characteristics desired in the membranes, such as the desired resistance, water-holding capacity or porosity, and dimensions.

Figure 2:
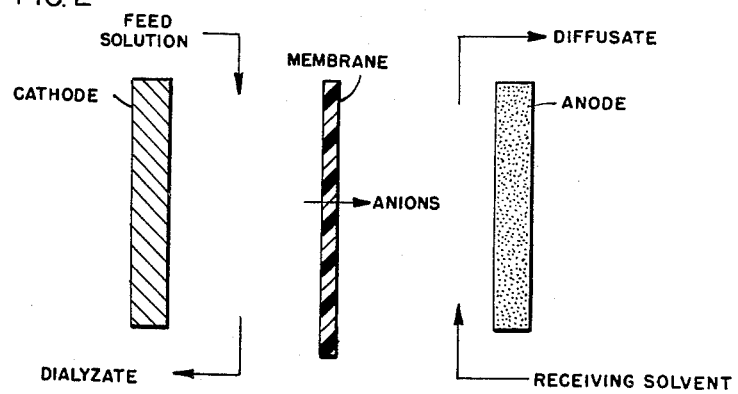
Figure 3:
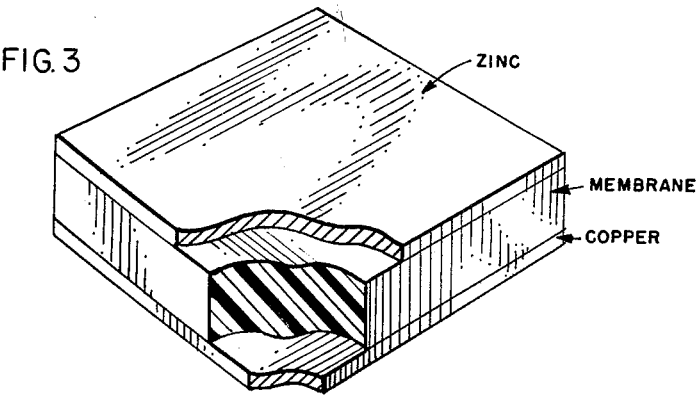

Additional objects of the invention include the provision of new dialysis methods, including electrodialysis, and dialyzators including more specialized apparatus such as electrical cells including voltaic and/or electrolytic cells. These and other objects of the invention will be apparent upon reference to the specification taken in conjunction with the attached drawings, in which like parts are identified by like reference characters in each of the views, and in which FIGURE 1 is a schematic representation of a dialysis cell employing a membrane according to the invention, the cell being a simple form adapted for test purposes;

FIGURE 2 is a schematic representation of a simple electrodialysis cell employing a membrane according to the invention, illustrating a method of electrodialyzing a feed solution; and FIGURE 3 is a schematic representation of a simple voltaic cell.

The new semi-permeable membrane of the invention comprises a solid layer of a homogeneous molecular dispersion of a water-insoluble, acid and alkali-resistant thermoplastic film-forming polymer and a polymer of N-vinyl pyrrolidone, the layer having high porosity relative to the porosities of layers of plastic material prepared by conventional methods.

The layers providing a semi-permeable membrane preferably have a water-holding capacity of at least 45% by weight on a wet basis. In a preferred embodiment of the invention, the layer contains a substantial quantity of pores over 30 angstrom units in size, and the pore size may be within about 200 angstrom units in a further preferred embodiment.

It is necessary for utility as a semi-permeable membrane that the layer have a low resistance to the diffusion of materials therethrough. Thus, a maximum resistance is provided in the layer of 10 ohms per square centimeter when measured in 0.15 N KCl. Specific applications may require lower resistances. For example, it is preferred to provide a membrane having a maximum of about 6 ohms resistance for dialysis of caustic solutions. It is further preferred in the case of battery separators that the resistance be a maximum of about 2 ohms as measured in the foregoing manner.

In attempts to prepare porous films of low resistance, it has been found that the available film-forming compositions do not provide the required porosity and do not respond to efforts to increase the porosity. For example, a film of a copolymer of vinyl chloride and acrylonitrile was lacking in sufficient porosity when cast which could not be increased sufficiently by solvent treatment. Various compositions which include polar compounds of other types may be provided with high porosity yet have no appreciable electrolytic conduction or have very high resistance. For example, films composed of a copolymer of vinyl chloride and acrylonitrile, and petroleum sulfonates could be swollen to provide increased porosity but gave no appreciable electrolytic conduction. Incorporation of other polar materials also resulted in unsatisfactory porosity.

The invention is concerned with the discovery that outstanding semi-permeable membranes are produced by the incorporation with the described water-insoluble film-forming polymer, of a polymer of N-vinyl pyrrolidone. The membranes have the necessary porosity and may be produced with very low resistances. Diffusion rates through the membranes are especially advantageous, and are considerably greater than other analogous membranes. The invention is also characterized by simplicity and economy in manufacture, constituting substantial advantages over other membranes. In the production of the membranes by swelling relatively impermeable films, the compositions are swollen very readily.

High molecular weight vinyl pyrrolidone polymers are most desirably employed, having a minimum molecular weight of about 5000. It is preferred that the molecular weight be greater than 20,000, and further preferably, greater than 40,000.

A new composition is provided which is useful for producing the semi-permeable membranes, and it comprises a mixture of an organic solvent and the polymers. In an advantageous embodiment, the mixture includes a minor proportion of a wetting agent, which functions as a release agent in casting the composition to a solid layer, especially on steel plates.

The invention also provides a method for producing the new and improved semi-permeable membranes, which involves casting to a solid layer the foregoing mixture of organic solvent and the polymers, and contacting the layer with a swelling solvent to produce pores therein sufficiently large for semi-permeation of the layer.

The casting step in the method produces a relatively impermeable layer unsuitable as a semi-permeable membrane in dialysis and like operations. The swelling method or step provides a macroporous layer having the desired porosity and low resistance, preferably below 10 ohms.

The relatively impermeable layer treated according to the invention is preferably produced by casting a mixture of the described polymers and an organic solvent. The polymers may be dissolved in the solvent or, at times, it is advantageous to cast a relatively viscous mixture or paste in which some of the polymeric material is dispersed but incompletely dissolved. Such mixtures are known as organosols or plastisols, and it is possible to prepare a higher solids content mixture than when using solutions. Further reduction in the quantity of solvent may be made by preparing solutions hot and in some cases, melts containing little solvent may be made. Other modifications may be necessary depending upon the polymeric materials, it merely being necessary that upon the completion of the casting process including removal of sufficient solvent to provide a solid film, a homogeneous molecular dispersion of the polymers is obtained which is equivalent to the product of casting a complete solution.

The method or step of swelling the relatively impermeable solid layer at times takes place very rapidly, so that it is desirable to reduce the rate of expansion of the layer. After reaching maximum expansion, the layers may shrink and increase in resistance. To avoid this result and afford ample time for transferring from the swelling operation to subsequent removal of solvent and hydration of the film for use as membranes, the swelling solvent may be mixed with a hydrophilic non-ionic surface active agent.

In this manner, very useful uniform semi-permeable membranes are provided. The membranes are strong while having low resistance. They are produced in a range of desired thicknesses, porosities and resistances, and substantially any useful size of membrane may be produced for any of diverse applications.

The invention also provides improved dialysis methods and dialyzators employing the new semi-permeable membranes. A preferred method comprises interposing a membrane between two solutions at least one of which contains a plurality of solutes, at least one of the solutes being diffusible through the membrane. A decreasing potential, with respect to the diffusible solute, is maintained from the solution containing a plurality of solutes to the second solution, thereby causing the diffusible solute to diffuse through the membrane from the solution of higher potential to the solution of lower potential. The potential differential or gradient may be provided for example by an applied voltage as in electrondialysis. Also, a concentration differential between the solutions may be provided, causing the solute to diffuse through the membrane from the solution of higher concentration to the solution of lower concentration. The differential may be maintained by supplying fresh solute solution to the zone of higher concentration contacting one side of the membrane and/or removing the diffusate from contact with the opposite side of the membrane.

Specific examples of dialyzators are illustrated in the attached drawings, which include apparatus for conducting simple dialysis operations and a voltaic cell in which dialysis is accompanied by the production of electrical energy.

FIGURE 1 illustrates a dialysis cell 1 composed of two half cells 2 and 3 which define compartments A and B. The compartments are separated by a membrane 4 prepared according to the invention. The half cells 2 and 3 are in the form of glass elbows, and their juncture with the membrane is sealed by rubber or Teflon gaskets 5. A solution concentrated with respect to the solutes to be dialyzed is placed in one compartment A, and a less concentrated receiving solvent is placed in the other compartment B. Due to the concentration differential, diffusible solutes diffuse from compartment A through the membrane 4 into compartment B.

In a unit of the type illustrated in FIGURE 1, diffusion is by concentration differential of the solutes, on opposite sides of the membrane. FIGURE 2 illustrates electrodialysis, wherein a decreasing potential from the cathode compartment to the anode compartment is maintained by an applied voltage. Also, there may be a concentration differential from the feed solution containing the solutes to be diffused, to the receiving solvent. The embodiment illustrated is adapted for the separation of anions. The diffusate becomes enriched in the solutes having a higher rate of diffusion, and the dialysate is enriched in those having lower diffusion rates, according to known principles.

FIGURE 3 schematically illustrates a simple essentially dry voltaic cell composed of zinc and copper electrodes separated by a membrane prepared according to the invention. In this embodiment, the electrolyte is contained in the membrane, and the membrane maintains differences in the concentration and/or the composition of the electrolyte in the immediate vicinity of each electrode. The cell is adapted for use in the manner described in U.S. Patent 2,747,009.

In similar fashion, the membranes are employed in cells such as described in U.S. Patent 2,422,045, where the membranes may serve as the barrier disc 32, for example. The membranes provide mechanical spacing means between the cathode and the anode and also prevent or limit migration of compounds and solids between the electrodes. The membrane pores permit the electrolyte to permeate therethrough for electrical contact with the electrodes, but owing to the semi-permeable nature thereof, reduce or prevent the free circulation of electrolyte. Use of the membranes of the invention provides a desirably low internal resistance in the cell. The new membranes are especially advantageous for use in portable hearing aids and the like, as illustrated in U.S. Patent 2,768,229. In such a cell, the membrane serves as the electrolyte carrier 9.

In a preferred practice of the invention, a membrane is prepared by casting an intimate mixture of the film-forming polymer and the polar N-vinyl pyrrolidone polymer, preferably from a solution thereof, thus producing a homogeneous molecular dispersion of the materials, which is distinct from the type of mixture obtained when a solid substance is dispersed in another material and remains in such dispersed form. The membrane is preferably a mixture of a water-insoluble substantially linear polyvinyl-type thermoplastic film-forming resin and the linear vinyl pyrrolidone polymer, in the form of a finely porous film. The polymers are at most insubstantially and preferably not cross-linked, containing not exceeding 2% cross-linking agent, by weight of the polymer. The amount of permissible cross-linking varies with the polymer. The ability to form a film, in particular, from an organic solvent solution of the polymers, is a necessary characteristic in the invention. The infusible, insoluble substances which are for the most part brittle and tend to crack upon drying are not suitable for use in the invention.

The polyvinyl-type polymers are those derived by the additional polymerization of at least one monoolefinic compound through the unsaturated aliphatic group. They are preferably addition polymers of the unsymmetrically substituted ethylene class, comprising polymers obtained by polymerization or copolymerization of monomers containing a

group, such as vinyl halides, vinylidene halides, vinyl esters, styrenes and acrylics.

The plastic film-forming materials used in the present invention may be of several types both as regards their chemical structure and their physical properties. The plastic film-forming material should be capable of being cast into a thin homogeneous film from an organic solvent casting solution. This film should be chemically stable, resistant to acids and alkalies, and water-insoluble, in order to provide ultimately a satisfactory composite membrane film. The film-forming material must also be compatible when dissolved or dispersed in a casting solution with the polar vinyl pyrrolidone polymer which is incorporated therewith at the time the membrane is cast.

A useful type of film-forming plastic material is that derived from the copolymerization of vinyl chloride and acrylonitrile. These polymers may range from between 45% and 80% by weight of vinyl chloride, preferably, between 60% and 80% vinyl chloride, the balance being acrylonitrile. Their specific viscosities at 20° C. are preferably from 0.2 to 0.6 (0.1 gram in 50 cc. acetonyl acetone). Such polymers are described in U.S. Patent No. 2,420,565. A typical polymer of this type is a commercial material sold under the trade name Dynel. This material contains a major portion, about 60%, of vinyl chloride and a minor portion, about 40%, of acrylonitrile and varies somewhat in its constituents from batch to batch as manufactured. The material as supplied in its filament or fiber form has a specific gravity of 1.31 at 81° F., a tenacity wet or dry of 2.5–3.5 grams per denier and a 42% to 40% elongation wet or dry. The material is soluble in acetone, cyclohexanone and dimethylformamide. It has a strain release beginning at 240° F. and a softening range between 300° to 325° F.

Polymers containing vinylidene chloride and vinyl chloride in a percent by weight of about 90% to 10% and copolymers of vinylidene chloride and acrylonitrile are also useful. Another type of useful polymer is the copolymers produced by the copolymerization of polyvinyl alcohol and butyraldehyde. This latter copolymerization produces polyacetals whose film-forming properties, when reacted under the proper conditions, are similar to those indicated for the vinyl chloride-acrylonitrile polymers. An additional polymer is a copolymer of vinyl chloride and vinyl acetate. The above polymers are all copolymers but homopolymers produced by the polymerization of acrylonitrile, vinyl chloride and vinylidene chloride are also contemplated.

The above listed polymers are only indicative of the general class of polymers that may be employed. The type of polymer that is useful is necessarily limited to its water-insolubility, chemical stability, and acid and alkali resistance. It is also limited by its solubility characteristics in organic solvents and its compatibility with the vinyl pyrrolidone polymer.

The preferred plastic film materials have a high degree of plastic flow and are generally clear to opaque in physical appearance. While they are water-insoluble, they have the ability to take up a quantity of water or polar organic solvent. This characteristic is important in the production and use of the membranes.

A preferred feature is the provision in the membrane of the same type of basic polymer structure in both the film-forming material and the vinyl pyrrolidone polymer, that resulting from the polymerization of vinyl-type monomers. The respective polymers are thus characterized by a high degree of compatibility.

The preferred polymer of N-vinyl pyrrolidone (N-vinyl butyrolactam, 1-vinyl-2-pyrrolidone) is polyvinyl pyrrolidone. It is also contemplated that copolymers of vinyl pyrrolidone may be employed, particularly with other vinyl monomers. The copolymer preferably contains a major proportion by weight of vinyl pyrrolidone. For example, a copolymer with a minor proportion of vinyl acetate may be used as the polar polymer. The vinyl pyrrolidone polymer is hydrophilic and preferably water-soluble.

The proportion of polymerized vinyl pyrrolidone in the mixture of polymers forming the membrane is preferably at least 10% by weight of the polymers. It is also preferred that a maximum of about 50% of vinyl pyrrolidone be provided, as higher proportions tend to reduce the strength of the membranes. These proportions refer to the vinyl pyrrolidone content exclusive of the amounts of monomers copolymerized therewith. The resistance of the membranes decreases with increasing concentrations of polymerized vinyl pyrrolidone and with increasing molecular weight of the vinyl pyrrolidone polymer. The remainder of the membrane may constitute the water-insoluble film-forming polymer. It is also possible to include minor proportions of materials which modify the characteristics of the membranes.

The initial relatively impermeable membranes from which the semi-permeable membranes are prepared, may be produced by dissolving the plastic film-forming polymer and the vinyl pyrrolidone polymer in a suitable solvent composed of one or more organic liquids. The solution is deposited in a layer of suitable thickness, and the solvent is evaporated until a rigid film structure is obtained. Suitable solvents include such materials as butyrolactone, dimethylformamide, N,N-dimethylacetamide, cyclopentanone, cyclohexanone, methyl and ethyl ketone and others. At times it may be advantageous to employ a solvent composed of a plurality of organic liquids, for example, cyclohexanone and isopropanol or methanol. Preferably, the solvent is gamma-butyrolactone. Employing a butyrolactone solution, the polymer content may be up to about 30% by weight of the solution, preferably 10–30% by weight. Comparable concentrations are employed with other solvents, depending upon the solubilities of the polymers.

In the formation of a casting solution, it may be advantageous to form individual solutions of the polymers and filter them to remove small gel particles, followed by combining into the casting solution. It is at times advisable that the casting solution be maintained at a moderately elevated temperature, about 100° F. or greater, to prevent gelling. This procedure is preferred in the use of polyvinyl chloride or copolymers having a high vinyl chloride content when dissolved in butyrolactone.

In casting the initial film, the solvent may be removed under drying conditions at a temperature up to about 400° F., the time varying with the temperature and with the thickness of the layer, e.g., from several minutes to a number of hours at about 200° F.–350° F. Drying is sufficient to reduce the solvent content of the film to about 30% or less by weight of the film or layer, on a dry basis. It is preferred to retain at least 10% of solvent in the film.

The membranes may be cast on a number of different supports such as glass or metal plates, and they may be cast or sprayed upon porous surfaces which act as bases, support or frameworks. To facilitate removal from the support, particularly from steel plates or belts, a wetting agent may be incorporated in the casting solution in a minor proportion, preferably in a proportion of about 1% to 20% by weight of the solution. A variety of wetting agents are suitable.

The solid layers containing the residual casting solvent are preferably next contacted with a swelling solvent for increasing the porosity and lowering the ohmic resistance, to produce semi-permeable membranes suitable for dialysis. The amount of swelling which is necessary varies with the initial condition of the film.

The preferred swelling solvent is butyrolactone. Other solvents which act to swell or expand the layer may be employed, for example, acetic acid, acetone, dimethylformamide, tetrahydrofuran, cyclohexanone, and cyclopentanone. In other to control the swelling so that the membrane is not weakened, it is necessary with some of the solvents that they be employed together with a liquid which does not act to swell the layer or has less swelling action. Thus, the swelling solvent may be mixed with water as a regulator to control the degree of swelling. Methanol may be mixed with the solvent to regulate swelling, and a preferred composition is composed of butyrolactone and methanol. This composition provides resistances on the order of 2 ohms per square centimeter or lower, when measured in 0.15 N KCl.

The solvent remaining the initial film after drying may be employed to produce swelling, which takes place when the film is immersed in methanol alone. The use of methanol alone is advantageous from the standpoint of operation and economy, but the resistances ordinarily are slightly higher, on the order of 6 ohms per square centimeter. Expansion of the layer is a function of both temperature, and concentration and type of swelling solvent, so that it may be advantageous to heat the solvent or solvent mixture to a moderately elevated temperature, e.g., up to about 190° F.

It is preferred to immerse the layer in the swelling solvent under conditions such that the necessary swelling will take place in a relatively short period of time under atmospheric conditions, i.e., within about 20 minutes. For example, a preferred dwelling composition contains about 15% to 50% of gamma-butyrolactone and the balance methanol and at times a surface active agent. Under atmospheric conditions, the maximum expansion may be obtained with such a mixture within several minutes.

The expansion with the foregoing composition may take place to rapidly, so that the layers begin to shrink slowly and the resistances increase. It is then preferred to decrease the expansion rate and increase the expansion time to provide for the necessary operating time while obtaining the best results. It has been discovered in the invention that the swelling solvent is then preferably mixed with a hydrophilic non-ionic surface active agent. The preferred materials are polyhydric alcohols and their partial esters and esters, especially the monohydric and dihydric polyether alcohols. Polyalkylene glycols and monoesters and monoethers thereof are further preferred. The proportion of the surface active agent in the swelling composition is preferably about 5% to 35% by weight of the composition. Where the composition is otherwise a mixture of swelling solvent and a liquid regulator of the degree of swelling, the surface active agent is added for the most part at the expense of the regulator.

While the swelling solvent may also be a solvent for the components of the membranes and for the membranes themselves, no substantial dissolution thereof takes place in the process.

After draining the solvent mixture, the expanded or swollen layer is washed with either methanol or water. The swollen film may be somewhat soft and weak. After washing, the resulting semi-permeable membrane is hard and possesses good strength. It is ordinarily preferred to wash with water, which produces less shrinking in the washing process. In the case of a methanol wash, the membrane is subsequently treated with water for use in the hydrated form. The membrane is normally stored moist, although it may be dried with care being taken not to cause excessive shrinkage, preferably drying rapidly at low temperature, e.g., atmospheri or below.

In a novel embodiment of the invention, the wet membrane may be impregnated with a non-solvent non-swelling organic liquid for use in non-aqueous media. It is further possible and preferred at times to effect rapid drying without excessive shrinkage by selecting a relatively volatile non-swelling non-polar organic liquid, boiling below about 240° F., such as carbon tetrachloride, diethyl ether, chloroform, and toluene. When the membrane is wet with water, the water is first replaced with a water miscible non-swelling organic liquid, preferably an alcohol, e.g., methanol, ethanol, and propanol. The water miscible liquid is next replaced by the non-polar liquid.

The membranes thus produced are at least .0001" in thickness preferably from 0.001 to 0.006" thick, measured in the water-hydrated form. Thicker films may be produced, e.g., up to about 25 mils. The thicker films may be formed by building up several films in the casting process with intermediate drying, or a single thick film may be cast and dried for an extended period of time, at e.g., 200° F., followed by swelling.

The following examples are illustrative of the methods, compositions and articles of the invention, but it will be understood that the invention is not limited to the particular components, proportions, conditions and procedures described therein. Unless otherwise indicated, the proportions are by weight except for the relative proportions of liquids, which are by volume.

EXAMPLE 1

Semi-permeable membranes were produced having the following proportions by weight of polymers:

(1) 33% polyvinyl pyrrolidone of molecular weight approximately 40,000
    67% Dynel (2) 33% polyvinyl pyrrolidone of molecular weight approximately 150,000
    67% Dynel (3) 33% polyvinyl pyrrolidone of molecular weight approximately 150,000
    67% copolymer of 90% polyvinyl chloride and 10% polyvinyl acetate.

The polymers were dissolved in gamma-butyrolactone, heated to about 150° F. during mixing, to produce a 20% by weight solution of the solids. Solutions were cast on stainless steel plates using a 0.012" doctor blade. The plates were precoated with polyethylene emulsion to assist in release of the films. The cast solutions were dried in a forced draft oven at 300° F. for one-half hour.

The resulting relatively impermeable membranes were removed from the plates and immersed in mixtures of gamma-butyrolactone and methanol for twenty minutes to swell the membranes, after which the solvent was drained and the membranes were hydrated by immersing in tap water for about 10 minutes. The following solvent mixtures were used, in volume proportions:

I. 30% butyrolactone
   70% methanol
II. 40% butyrolactone
   60% methanol
III. 50% butyrolactone
   50% methanol The ohmic resistances of the films were determined in a cell with the following system:

| Pt | KCl (0.15 N) | membrane | KCl (0.15 N) | Pt |
|----|--------------|----------|--------------|----|

After thorough equilibration, the samples were placed in the cell and the conductivity measurements read on a Leeds & Northrup Model S, 4000 type, single point, Micromax conductivity recorder at approximately 25° C. The readings were converted, corrected for solution resistance and reported as ohms/cm.$^2$.

The linear expansions of the layers upon swelling were also determined by measuring the increase in diameter of circular sections. Linear expansion is measured in this manner as a basis for comparison of swelling properties. The thickness of the layers may also increase in varying degrees. The results were as shown in the following Table I.

Table I

| Solvent Mixture | I | | II | | III | |
|---|---|---|---|---|---|---|
| Membrane No. | Expansion, percent | Resistance, ohm/cm.$^2$ | Expansion, percent | Resistance, ohm/cm.$^2$ | Expansion, percent | Resistance, ohm/cm.$^2$ |
| 1 | <2 | 5 | 13.8 | 3 | 27.3 | 2.8 |
| 2 | 13.8 | 3 | 27.3 | 1.6 | 41.0 | 1.2 |
| 3 | 13.8 | 3 | 13.8 | 3 | 17.0 | 3 |

EXAMPLE 2

In the manner of Example 1, membranes were prepared with varying weight proportions of polyvinyl pyrrolidone having a molecular weight of 40,000 and the balance Dynel. The drying temperatures were also varied at a constant drying time of thirty minutes. The following swelling solvents, in volume proportions, were employed with an immersion time of twenty minutes:

A. Methanol
B. 15% gamma-butyrolactone, 85% methanol.
C. 30% gamma-butyrolactone, 70% methanol.
D. 45% gamma-butyrolacetone, 55% methanol.

The resistances produced are shown in the following Table II.

Table II

| Swelling Composition | | Resistance, ohm/cm.$^2$ | | | |
|---|---|---|---|---|---|
| PVP Proportion, percent | Drying Temp., °F. | A | B | C | D |
| 30 | 300 | 12 | 5.1 | 4.0 | 0.8 |
| 20 | 300 | 74 | 51 | 12 | 2.6 |
| 30 | 260 | 7 | 9.8 | 8.2 | 1.6 |
| 20 | 260 | 74 | 24 | 12.5 | 3.8 |
| 30 | 220 | 5.2 | 11 | 22 | 2.6 |
| 20 | 220 | 16.5 | 37 | 34 | 2.0 |

EXAMPLE 3

In the manner of Example 1, membranes were produced with various drying temperatures and times. The membranes were composed of 30% polyvinyl pyrrolidone (M.W. 40,000) and 70% Dynel by weight, and were cast from 20% by weight solids solution in gamma-butyrolactone. The solvent contents of the layers after drying were determined by drying to constant weight at 110° C., requiring 96 hours. The dried layers were expanded in methanol for twenty minutes, washed with water, and the resistances measured. The results were as shown in the following Table III.

Table III

| Drying Condition | | Solvent Content, percent by weight | Resistance, ohm/cm.$^2$ |
|---|---|---|---|
| Temp., °F. | Time, Mins. | | |
| 350 | 14 | 22.5 | 6.4 |
| 300 and 350 | 7 and 7 | 27.7 | 5.8 |
| 300 | 19 | 28.5 | 5.4 |
| 300 | 16 | 29.5 | 5.2 |
| 300 | 14 | 30.0 | 4.6 |
| 300 | 13 | 29.1 | 4.0 |

EXAMPLE 4

In the manner of Example 1, membranes were produced containing 33% polyvinyl pyrrolidone (M.W. 150,000) and 67% of polyvinyl chloride or 67% of a copolymer of 97% polyvinyl chloride and 3% polyvinyl acetate. Solid layers were cast from 20% solutions in gamma-butyrolactone maintained at about 100° F., and dried at 300° F. for 30 minutes. The dried layers were expanded by immersion in a mixture of 30% gamma-butyrolactone and 70% methanol. The resistances of the resulting membranes were 4 and 6 ohm/cm.$^2$, respectively.

EXAMPLE 5

Relatively impermeable layers were immersed in different swelling compositions and the resistances determined. The layers were produced by casting a 20% solids solution of 30% polyvinylpyrrolidone (M.W. 40,000)—70% Dynel in butyrolactone, using a 0.012 inch doctor blade, followed by drying in a forced draft oven at 300° F. for 30 minutes. The results for a twenty minute contact time in the swelling composition were as shown in the following Table IV. In each case, the treatment shown was followed by washing and hydrating with water.

Table IV

| Swelling conditions | Resistance, ohm/cm.$^2$ |
|---|---|
| Dichlorobutane followed by 10 min. methanol rinse | 8 |
| 5% gamma-butyrolactone, 95% dichlorobutane followed by 10 min. methanol rinse | 3.2 |
| 50% Acetic acid, 50% water (100° F.) | 10 |
| 20% Acetic acid, 80% Methanol | 8 |

EXAMPLE 6

Impermeable layers were cast as in preceding examples from a 20% solids solution in butyrolactone of 30% polyvinyl pyrrolidone (M.W. 40,000) and 70% Dynel, and the solution also contained 4% by weight of one of the wetting agents:

A non-foaming, non-ionic wetting agent of the type (RO)PO(OR')$_2$, where R is a medium-chain alkyl group, and R' is a water-solubilizing group. P$_2$O$_5$ content, 16% (Victawet 12)
1-(2-hydroxyethyl)-2-n-heptadecenyl-imidazoline
Sulfonated oleic acid (sulfonate OA-5)

The solution films were dried to solid layers at 300° F. for 30 minutes. Each of these materials produced good release from the stainless steel castings plate without use of the polyethylene coating as employed in Example 1.

EXAMPLE 7

The procedure of Example 6 was repeated with varying proportions of the imidazoline wetting agent in the casting solution. The impermeable layers were contacted for twenty minutes with either methanol or a solution of 30% gamma-butyrolactone (GBL) and 70% methanol, followed by water washing and hydration. The results were as shown in the following Table V.

Table V

| Imidazoline, percent by weight of solution | Results | Resistances, ohm/cm.$^2$ | |
|---|---|---|---|
| | | Methanol treated | GBL-MeOH treated |
| 20 | Excellent release, surface coated. | 7.0 | 2.5 |
| 10 | do | 7.0 | 4.5 |
| 5 | Excellent release | 8.5 | 5.0 |
| 2.5 | do | 7.5 | 5.5 |
| 1.0 | do | 7.0 | 6.0 |

EXAMPLE 8

The expansion and shrinkage characteristics of impermeable cast layers prepared from the polyvinyl pyrrolidone-Dynel composition of Example 5 were determined in gamma-butyrolactone-methanol solutions, by immersing 2.9 centimeter circles of the solid layers in the solvent and measuring the increase in diameter during contacting. The results were as shown in the following Table VI.

*Table VI*

| Time (minutes) | 0 | 1 | 2 | 3 | 4 | 5 | 6 | 7 |
|---|---|---|---|---|---|---|---|---|
| Expansion in 30% GBL—70% MeOH mixture, percent | 0 | 20.8 | 22.5 | 19.0 | 17.0 | 17.0 | 16.0 | |
| Expansion in 40% GBL—60% MeOH mixture, percent | 0 | 20.0 | 24.0 | 22.0 | 20.0 | 20.0 | 19.0 | 18.0 |

Circular segments of the same composition when immersed in 33% gamma-butyrolactone, 67% methanol for one and one-half minutes resulted in a resistance of 2–3 ohms. Contacting for twenty minutes resulted in a resistance of 6–7 ohms.

EXAMPLE 9

The procedure of Example 8 was repeated, expanding the layers in a mixture of 30% gamma-butyrolactone, 40% methanol, and 30% of a third material, in volume proportions, for decreasing the expansion rate. The layers were contacted in the swelling composition for ten minutes, with the results shown in the following Table VII.

*Table VII*

| Third material | Expansion, percent | Resistance, ohm/cm.² |
|---|---|---|
| Solid polyethylene glycol (Carbowax 1540) | 7 | 3 |
| Alkylated aryl polyether alcohol, octyl phenol reacted with 10 mols of ethylene oxide (Triton X100) | 11 | 3 |
| Polyethylene glycol monolaurate, molecular weight of glycol approximately 400 | 11 | 3.4 |
| Glycerin | 4 | 5.0 |
| Control (30% butyrolactone, 70% methanol) | 7 | 5.5 |

EXAMPLE 10

In the manner of Example 9, various swelling mixtures containing a swelling regulator, and either glycerin or Triton X–100, were contacted with the membrane layers for 10 minutes, with the results shown in the following Table VIII.

*Table VIII*

| Solvent mixture, volume proportions | Expansion, percent | Resistance, ohm/cm.² |
|---|---|---|
| 5% Glycerin—37.5% GBL—57.5% MeOH | | 3.2 |
| 10% Glycerin—37.5% GBL—52.5% MeOH | | 3.8 |
| 20% Glycerin—37.5% GBL—42.5% MeOH | | 3.8 |
| 30% Glycerin—45% GBL—25% MeOH | 24 | 6.2 |
| 30% X-100—45% GBL—25% MeOH | 26 | 1.6 |
| 30% X-100—30% GBL—40% MeOH | 14 | 3.0 |
| 20% X-100—30% GBL—50% MeOH | 10 | 4.2 |

EXAMPLE 11

The water-holding capacities were determined for several membranes prepared in the manner of Example 5, employing the swelling conditions and with the results shown in the following Table IX.

*Table IX*

| Swelling Composition, volume proportions | Contact time, mins. | Resistance, ohms/cm.² | Water holding capacity, percent |
|---|---|---|---|
| 37.5% GBL—62.5% MeOH | 5 | 2.6 | 58.5 |
| 37.5% GBL—30% glycerin—32.5% MeOH | 10 | 5.0 | 62.0 |
| 37.5% GBL—30% Triton X-100—32.5% MeOH | 10 | 2.2 | 65.5 |
| MeOH | 20 | 6.0 | 46.5 |

Moisture determinations were made by completely hydrating the film and quickly wiping the excess water off the surface of the film between moist filter papers. The sample was immediately placed in a weighing dish, covered, and the wet membrane weight obtained. Dry weight was obtained by drying the sample to constant weight at 105° C. (approximately one hour). Results were calculated as follows:

Percent water holding capacity $$= \frac{\text{Wet weight} - \text{dry weight}}{\text{wet weight}} \times 100$$

EXAMPLE 12

Semi-permeable membranes were produced employing the following copolymers of N-vinyl pyrrolidone, which are water-soluble, in proportions by weight:

A. 70% vinyl pyrrolidone, 30% vinyl acetate
B. 60% vinyl pyrrolidone, 40% vinyl acetate In each case, a 50% solution of the copolymer in methyl ethyl ketone was mixed with a 20% solution of Dynel in gamma-butyrolactone, and gamma-butyrolactone was added, to produce a casting solution containing 20% of a mixture of 30% copolymer and 70% Dynel, all proportions being by weight. The resulting proportion of polymerized vinyl pyrrolidone was 21% by weight of the polymers employing copolymer A, and 18% employing B.

The casting solutions at atmospheric temperature were cast on stainless steel plates precoated with polyethylene emulsion. The layers were dried at 260° F. for 30 minutes and removed.

One portion of each layer was immersed in methanol for 20 minutes followed by water washing, and one portion of each was immersed in a swelling mixture for 10 minutes followed by water washing, the mixture containing in volume proportions, 37.5% gamma-butyrolactone, 37.5% methanol, and 25% Triton X–100. The resistances in ohms per cm.² of the resulting membranes were as follows:

| | A | B |
|---|---|---|
| Swelling mixture | 2 | 6.6 |
| Methanol | 7.2 | 12.5 |

EXAMPLE 13

A portion of each of the final swollen membranes numbered 1 and 2 in Example 1, produced by contact with solvent mixture 1, was placed between two half cells of the dialysis test unit shown in FIGURE 1 of the drawing. A 1N solution of NaCl was placed in one cell A and deionized water in the other cell B. The deionized water was stirred and its specific conductance measured periodically. The rates of increase in conductance were 11.5 and 18.0 micromhos per minute for the respective membranes. Similarly, the rates of increase in conductance with 1 N naphthalene sulfonic acid were 10.0 and 16.0 micromhos per minute, respectively. When the test was repeated with a 1 N solution of a high molecular weight fraction, of lignin sulfonic acid in place of NaCl, no increase in conductance was found in the cell B when employing membrane No. 1, and an increase of two micromhos per minute was found when employing membrane No. 2.

The membranes may therefore be employed in simple dialysis, or in electrodialysis as illustrated in FIGURE 2, to separate chloride or naphthalene sulfonic acid anions from lignin sulfonic acid anions in a feed solution, the former anions being enriched in the diffusate.

In the foregoing manner, semi-permeable membranes are produced and employed which provide substantial advantages of importance in commercial applications. Diffusion rates through the membranes are very advantageous. The membranes are characterized by good resistance to chemical and physical attack. At the same time, they have the low ohmic resistance required for use in various applications. The membranes may be tailored to a particular use. The porosity and resistance may be adjusted, and the membranes can be made in suitable sizes and thicknesses. The new method of production is reliable and reproducible, and it is very well adapted for commercial production, especially owing to its simplicity and economy.

The invention is hereby claimed as follows:

1. A semi-permeable membrane comprising a solid layer of a homogeneous molecular dispersion of a water-insoluble, acid and alkali-resistant thermoplastic film-forming polymer, and a polymer of N-vinyl pyrrolidone, the proportion of polymerized N-vinyl pyrrolidone in said membrane being about 10% to 50% by weight of the solids content and the remainder of the solids in said membrane consisting essentially of said thermoplastic film-forming polymer, the pores in said membrane being expanded by contact with a swelling liquid until the pore size is sufficiently large for semi-permeation, said membrane having a maximum resistance of 10 ohms per square centimeter measured in 0.15 N KCl.

2. A semi-permeable membrane comprising a solid layer of a homogeneous molecular dispersion of a water-insoluble, acid and alkali-resistant thermoplastic film-forming polymer, and a copolymer of N-vinyl pyrrolidone in a major weight proportion and vinyl acetate in a minor proportion, the proportion of polymerized N-vinyl pyrrolidone in said membrane being about 10% to 50% by weight of the solids content and the remainder of the solids in said membrane consisting essentially of said thermoplastic film-forming polymer, the pores in said membrane being expanded by contact with a swelling liquid until the pore size is sufficiently large for semi-permeation, said membrane having a maximum resistance of 10 ohms per square centimeter measured in 0.15 N KCl.

3. A membrane as defined in claim 1 having a water-holding capacity of at least 45% by weight on a wet basis.

4. A membrane as defined in claim 1 wherein said film-forming polymer is a vinyl polymer.

5. A membrane as defined in claim 1 wherein said film-forming polymer includes polymerized vinyl chloride.

6. The method for producing a semi-permeable membrane which comprises contacting a relatively impermeable solid layer of a homogeneous molecular dispersion of a water-insoluble, acid and alkali-resistant thermoplastic film-forming polymer, and a polymer of N-vinyl pyrrolidone, the proportion of polymerized N-vinyl pyrrolidone in said layer being about 10% to 50% by weight of the solids content and the remainder of the solids in said membrane consisting essentially of said thermoplastic film-forming polymer, with a swelling solvent for the layer to produce pores therein sufficiently large for semi-permeation of the layer, said membrane having a maximum resistance of 10 ohms per square centimeter measured in 0.15 N KCl.

7. The method defined in claim 6 wherein the resulting membrane has a water-holding capacity of at least 45% by weight on a wet basis.

8. The method defined in claim 6 wherein said swelling solvent includes butyrolactone.

9. The method defined in claim 6 wherein said swelling solvent is mixed with a hydrophilic non-ionic surface active agent.

10. The method in claim 9 wherein said surface active agent is selected from the group consisting of monohydric and dihydric polyether alcohols.

11. An electrical cell comprising a pair of electrodes, means providing a space to receive an electrolyte, and the membrane of claim 1 interposed between said electrodes in this space.

12. The dialysis method which comprises interposing a semi-permeable membrane as claimed in claim 1 between two solutions at least one of which contains a plurality of solutes, at least one said solute being diffusible through said membrane, and maintaining a decreasing potential with respect to said last-named solute from said solution containing a plurality of solutes to the second said solution, thereby causing said last-named solute to diffuse through said membrane from the solution of higher to the solution of lower potential.

13. A semi-permeable membrane comprising a solid layer of a homogeneous molecular dispersion of a copolymer of about 45% to 80% by weight of vinyl chloride and the balance acrylonitrile, and a vinyl polymer containing a major weight proportion of N-vinyl pyrrolidone, the proportion of polymerized N-vinyl pyrrolidone in said membrane being about 10% to 50% by weight of the solids content, said N-vinyl pyrrolidone polymer having a molecular weight greater than about 20,000, the remainder of the solids in said membrane consisting essentially of said copolymer, the pores in said membrane being expanded by contact with a swelling liquid until the pore size is sufficiently large for semi-permeation, and said membrane having a maximum resistance of 10 ohms per square centimeter measured in 0.15 N KCl.

14. A membrane as defined in claim 13 having a water-holding capacity of at least 45% by weight on a wet basis and pores over 30 angstrom units in size.

15. The method for producing a semi-permeable membrane which comprises casting a layer of a 10% to 30% by weight solution in a solvent comprising butyrolactone, of polymers comprising a copolymer of about 45% to 80% by weight of vinyl chloride and the balance acrylonitrile, and polyvinylpyrrolidone in a proportion of about 10% to 50% by weight of said polymers, the remainder of the solids in said membrane consisting essentially of said copolymer, said polyvinylpyrrolidone having a molecular weight greater than about 20,000, removing said solvent from said layer to a solvent content of about 10% to 30% by weight on a dry basis, and contacting the resulting layer with a swelling solvent for the layer to produce a semi-permeable membrane having a maximum resistance of 10 ohms per square centimeter measured in 0.15 N KCl.

16. The dialysis method which comprises interposing a semi-permeable membrane between two solutions at least one of which contains a plurality of solutes, at least one said solute being diffusible through said membrane, and maintaining a decreasing potential with respect to said last-named solute from said solution containing a plurality of solutes to the second said solution, thereby causing said last-named solute to diffuse through said membrane from the solution of higher to the solution of lower potential, said membrane comprising a solid layer of a homogeneous molecular dispersion of a water-insoluble, acid and alkali-resistant thermoplastic film-forming polymer, and a polymer of N-vinyl pyrrolidone, the proportion of polymerized N-vinyl pyrrolidone in said membrane being about 10% to 50% by weight of the solids content and the remainder of the solids in said membrane consisting essentially of said thermoplastic film-forming polymer, said N-vinyl pyrrolidone polymer having a molecular weight greater than about 20,000, and said membrane having a maximum resistance of 10 ohms per square centimeter measured in 0.15 N KCl.

References Cited in the file of this patent

UNITED STATES PATENTS

| | | |
|---|---|---|
| 2,593,540 | Cornwell et al. | Apr. 22, 1952 |
| 2,790,783 | Coover et al. | Apr. 30, 1957 |

UNITED STATES PATENT OFFICE

CERTIFICATE OF CORRECTION

Patent No. 3,069,340                            December 18, 1962

Morris Mindick et al.

It is hereby certified that error appears in the above numbered patent requiring correction and that the said Letters Patent should read as corrected below.

Column 6, line 31, for "dissolcing" read -- dissolving --; column 7, line 21, after "remaining" insert -- in --; line 36, for "dwelling" read -- swelling --; column 11, Table VIII, column 2 thereof, for "24" read -- 14 --.

Signed and sealed this 1st day of October 1963.

(SEAL)
Attest:

ERNEST W. SWIDER                                  DAVID L. LADD

Attesting Officer                                      Commissioner of Patents